United States Patent
Wirola

(10) Patent No.: US 9,955,309 B2
(45) Date of Patent: Apr. 24, 2018

(54) COLLECTING POSITIONING REFERENCE DATA

(75) Inventor: Lauri Aarne Johannes Wirola, Tampere (FI)

(73) Assignee: Provenance Asset Group LLC, Essex, CT (US)

( * ) Notice: Subject to any disclaimer, the term of this patent is extended or adjusted under 35 U.S.C. 154(b) by 0 days.

(21) Appl. No.: 14/372,170

(22) PCT Filed: Jan. 23, 2012

(86) PCT No.: PCT/IB2012/050305
§ 371 (c)(1),
(2), (4) Date: Jul. 14, 2014

(87) PCT Pub. No.: WO2013/110971
PCT Pub. Date: Aug. 1, 2013

(65) Prior Publication Data
US 2014/0335894 A1    Nov. 13, 2014

(51) Int. Cl.
| G01C 21/30 | (2006.01) |
| H04W 4/02 | (2018.01) |
| H04W 64/00 | (2009.01) |
| G01C 21/20 | (2006.01) |
| G01S 5/02 | (2010.01) |

(52) U.S. Cl.
CPC .......... *H04W 4/028* (2013.01); *G01C 21/206* (2013.01); *G01S 5/0252* (2013.01); *H04W 64/00* (2013.01); *G01S 5/0278* (2013.01)

(58) Field of Classification Search
CPC .................................................... H04W 24/00
USPC .............................. 701/469, 533; 455/456.1
See application file for complete search history.

(56) References Cited

U.S. PATENT DOCUMENTS

| 6,131,296 A | 10/2000 | Fager |
| 6,539,229 B1 | 3/2003 | Ali |
| 6,865,395 B2 | 3/2005 | Riley |
| 7,053,829 B2 | 5/2006 | Krause et al. |
| 7,729,707 B2 | 6/2010 | Aljadeff et al. |
| 8,224,350 B2 | 7/2012 | Marshall et al. |
| 8,462,745 B2 | 6/2013 | Alizadeh-Shabdiz |

(Continued)

FOREIGN PATENT DOCUMENTS

| CN | 102037376 | 4/2011 |
| WO | 2011/077166 A1 | 6/2011 |
| WO | 2011144968 | 11/2011 |

OTHER PUBLICATIONS

Extended European Search Report received for corresponding European Patent Application No. 12866822.5, dated Aug. 24, 2015, 7 pages.

(Continued)

*Primary Examiner* — Vladimir Magloire
*Assistant Examiner* — Majid Syed
(74) *Attorney, Agent, or Firm* — Dinsmore & Shohl LLP

(57) ABSTRACT

It is inter alia disclosed to obtain or generate a plurality of sets of positioning reference data, at least one set of positioning reference data of the plurality of set of positioning reference data comprising a respective position information obtained or generated based on position-related information from at least one sensor, and comprising a respective signal characteristic representation associated with at least one received signal from at least one wireless coverage providing entity.

19 Claims, 4 Drawing Sheets

(56) References Cited

U.S. PATENT DOCUMENTS

| | | | |
|---|---|---|---|
| 9,341,702 | B2 | 5/2016 | Reimann |
| 9,384,215 | B2 | 7/2016 | Peeters et al. |
| 2002/0009972 | A1 | 1/2002 | Amento et al. |
| 2004/0203539 | A1 | 10/2004 | Benes et al. |
| 2006/0170591 | A1 | 8/2006 | Houri |
| 2007/0236381 | A1 | 10/2007 | Duchi et al. |
| 2007/0252721 | A1 | 11/2007 | Geurts |
| 2009/0005975 | A1* | 1/2009 | Forstall ............ G01C 21/20 701/533 |
| 2009/0043504 | A1* | 2/2009 | Bandyopadhyay .... G01C 17/38 701/469 |
| 2009/0153289 | A1 | 6/2009 | Hope et al. |
| 2009/0239591 | A1 | 9/2009 | Alameh et al. |
| 2009/0295648 | A1 | 12/2009 | Dorsey et al. |
| 2010/0323723 | A1 | 12/2010 | Gerstenberger et al. |
| 2011/0039517 | A1* | 2/2011 | Wigren ............ G01S 5/0252 455/404.2 |
| 2011/0077030 | A1* | 3/2011 | Wigren ............ G01S 5/0252 455/456.5 |
| 2011/0090081 | A1 | 4/2011 | Khorashadi et al. |
| 2011/0172916 | A1* | 7/2011 | Pakzad ............ G01C 21/14 701/533 |
| 2011/0231133 | A1 | 9/2011 | O'Hare |
| 2011/0246148 | A1 | 10/2011 | Gupta et al. |
| 2011/0294516 | A1 | 12/2011 | Marshall et al. |
| 2012/0098802 | A1 | 4/2012 | Woon Feather |
| 2013/0029685 | A1* | 1/2013 | Moshfeghi ............ G01S 19/48 455/456.1 |
| 2013/0222271 | A1 | 8/2013 | Alberth et al. |
| 2014/0171107 | A1 | 6/2014 | Kao et al. |

OTHER PUBLICATIONS

Widyawan et al., "A Novel Backtracking Particle Filter for Pattern Matching Indoor Localization", Proceedings of the first ACM international workshop on Mobile entity localization and tracking in GPS-less environments, Sep. 19, 2008, pp. 79-83.

International Search Report and Written Opinion received for corresponding Patent Cooperation Treaty Application No. PCT/IB2012/050305, dated Nov. 6, 2012, 11 pages.

Shin H. et al. Wi-Fi Fingerprint-based topological map building for indoor user tracking, 2010 IEEE 16th International Conference on Embedded and Real-Time Computing Systems and Applications (RTCSA), IEEE, Piscataway, NJ, USA, ISBN 978-1-4244-8480-5, pp. 105-113.

Kothari et al., "Robust Indoor Localization on a Commercial Smart-Phone", CMU-RI-TR-11-27, Aug. 2011, 11 pages.

Retscher et al., "Performance and Accuracy Test of The WLAN Indoor Positioning System "IPOS"", Proceedings of the 3rd Workshop on Positioning, Navigation and Communication, 2006, pp. 7-16.

English Language Machine Translation of Chinese Patent Application Publication No. CN102037376, published Apr. 7, 2011, 27 pages.

* cited by examiner

COLLECTING POSITIONING REFERENCE DATA

RELATED APPLICATION

This application was originally filed as PCT Application No. PCT/IB2012/050305 filed Jan. 23, 2012.

FIELD

Embodiments of this invention relate to the field of obtaining and generating of positioning reference data.

BACKGROUND

As an alternative or add-on to satellite-based positioning systems, positioning systems in which a present position of a terminal is estimated based on an identification of coverage areas that can currently be detected by the terminal have gained recent interest. For instance, a terminal may identify and receive a signal characteristic representative of all currently detectable coverage areas, which are provided by wireless Coverage-Providing Entities (CPEs) (such as for instance base stations of a cellular Communication System (CS), or Wireless Local Area Network (WLAN) Access Points (APs)), and consult a local or remote database that provides positioning reference data in order to compare the signal characteristic representative of all currently detectable CPEs with the positioning reference date for obtaining or estimating the local position.

For instance, the CPEs may represent WLAN APs and the positioning reference data may be used for indoor positioning. The WLAN infrastructure is widely deployed—practically everywhere in the developed world public buildings, office spaces etc. are equipped with a WLAN connectivity. Moreover, typically there is a lot of diversity in the WLAN signal space because of the high number of access points deployed in these buildings. But any other suited CPEs may be used for positioning, e.g. base stations of cellular Communications Systems or other wireless transmitting stations.

Positioning based on CPEs typically has two phases. In the first phase the signals of the CPEs are received and fingerprints of the signal characteristic of the received signals of the CPEs are taken at different positions in order to generate or obtain a database. This database may be used in as second phase for estimating the position of a terminal when the received signal characteristics of the received signals of the CPEs are compared with the fingerprints in the database.

SUMMARY OF SOME EMBODIMENTS OF THE INVENTION

Generating or obtaining a database comprising high quality fingerprints may become a delicate task.

According to a first aspect of the invention, a method is disclosed, comprising generating or obtaining a plurality of sets of positioning reference data, at least one set of positioning reference data of the plurality of set of positioning reference data comprising:

a respective position information obtained or generated based on position-related information from at least one sensor, and a respective signal characteristic representation associated with at least one received signal from at least one wireless coverage providing entity.

According to a second aspect of the invention, an apparatus is disclosed, which is configured to perform the method according to the first aspect of the invention, or which comprises means for performing the method according to the first aspect of the invention, i.e. means for generating or obtaining a plurality of sets of positioning reference data, at least one set of positioning reference data of the plurality of set of positioning reference data comprising a respective position information obtained or generated based on position-related information from at least one sensor, and comprising a respective signal characteristic representation associated with at least one received signal from at least one wireless coverage providing entity.

According to a third aspect of the invention, an apparatus is disclosed, comprising at least one processor and at least one memory including computer program code, the at least one memory and the computer program code configured to, with the at least one processor, cause the apparatus at least to perform the method according to the first aspect of the invention. The computer program code included in the memory may for instance at least partially represent software and/or firmware for the processor. Non-limiting examples of the memory are a Random-Access Memory (RAM) or a Read-Only Memory (ROM) that is accessible by the processor.

According to a fourth aspect of the invention, a computer program is disclosed, comprising program code for performing the method according to the first aspect of the invention when the computer program is executed on a processor. The computer program may for instance be distributable via a network, such as for instance the Internet. The computer program may for instance be storable or encodable in a computer-readable medium. The computer program may for instance at least partially represent software and/or firmware of the processor.

According to a fifth aspect of the invention, a computer-readable medium is disclosed, having a computer program according to the fourth aspect of the invention stored thereon. The computer-readable medium may for instance be embodied as an electric, magnetic, electro-magnetic, optic or other storage medium, and may either be a removable medium or a medium that is fixedly installed in an apparatus or device. Non-limiting examples of such a computer-readable medium are a RAM or ROM. The computer-readable medium may for instance be a tangible medium, for instance a tangible storage medium. A computer-readable medium is understood to be readable by a computer, such as for instance a processor.

In the following, features and embodiments pertaining to all of these above-described aspects of the invention will be briefly summarized.

For instance, the apparatus may for instance be a mobile apparatus which can be moved through an indoor environment in order to obtain or generate the plurality of sets of positioning reference data.

The mobile apparatus may be a mobile terminal (e.g. a portable device, such as for instance a mobile phone, a personal digital assistant, a laptop or tablet computer, to name but a few examples).

For instance, non-limiting examples of wireless CPEs are CPEs of wire-bound or wireless cell stations (CS). For instance, a CPE may be a base station of a cellular radio CS, such as for instance a second generation (2G), third generation (3G) or fourth generation (4G) CS, or an AP or beacon of a non-cellular radio CS, such as for instance a WLAN system, a Worldwide Interoperability for Microwave Access (WiMAX) system, a Bluetooth system, a radio-frequency identification (RFID) system a broadcasting system such as for instance Digital Video Broadcasting (DVB), Digital Audio Broadcasting (DAB) or Frequency-Modulated (FM)/Amplitude-Modulated (AM) radio, a Near Field Communication (NFC) system, etc.).

As an example, the respective signal characteristic representation of a set of positioning reference data may be considered to represent a kind of fingerprint of at least one received signal from the at least one CPE associated with this set of positioning reference data. As an example, the respective signal characteristic may comprise for each of at least one of CPE the measured signal strength associated with the respective CPE. Furthermore, the respective signal characteristic may further comprises an identifier of the respective CPE.

Thus, for instance, the plurality of sets of positioning reference data may be obtained or generated at different time instants of time. For instance, the method may be performed by an apparatus, wherein the apparatus may be moved along a route through an indoor environment, wherein the plurality of sets of positioning reference data may be obtained or generated at different location points at different time instants. For instance, a user may carry the apparatus along the route.

The signal characteristic representation of a respective set of positioning reference data is associated with the respective position information of this respective set of positioning reference data. As an example, a position information and the signal characteristic representation of the same set of positioning reference data may be both time stamped in order to bind the position information with the signal characteristic representation.

Thus, for instance, for several location points in an indoor environment a respective set of positioning reference data can be obtained or generated, wherein the plurality of sets of positioning reference later can be used for performing an estimation of the position based on the a signal characteristic representation associated with at least one received signal of at least one CPE.

The position information of a respective set of positioning reference data is obtained or generated based on position-related information from at least one sensor. For instance, this at least one sensor may represent any kind of at least one inertial sensor and/or any kind of altitude sensor. As an example, the at least one sensor may represent at least one of an accelerometer and a gyroscope. Thus, the at least one sensor may be configured to detect a movement into at least two directions (e.g., at least two axis), wherein, for instance, the position-related information may represent at least one acceleration in a respective direction. This movement may represent a movement in a two-dimensional space or in a three dimensional space. As an example, at least a 3-axis accelerometer and/or a 3-axis gyroscope may be used. Furthermore, as an example, the at least one sensor may comprise an altitude sensor which is configured to provide altitude information. As an example, this altitude sensor may represent a kind of barometer, wherein the barometer may be configured to output of air pressure information, which can be used for estimating the height. For instance, a calibration could be performed in order to assign a known height to a measured air pressure information. Thus, a change in the measured air pressure information indicates a relative change in height, wherein due to the calibration the absolute height can be estimated based on the change in height and the known height associated with the measured air pressure information during calibration.

Furthermore, as an example, the at least one sensor may comprise a magnetometer which is configured to output direction information. For instance, said magnetometer may represent a compass.

Thus, the position information obtained or generated based on the position-related information may represent a two-dimensional position information or may represent a three-dimensional component comprising an altitude information. For instance, the altitude information may be a continuous representation, e.g. a height from a reference level, e.g. a sea level or another well-suited reference level. As an example, the height might be represented in meters, inches or any other well-suited quantity. Or, for instance, the altitude information may be a discrete representation, e.g. in terms of floor levels or any other well-suited discrete representation.

Furthermore, for instance, said at least one sensor may be used for determining translation information. Thus, the output of said at least one sensor may be used for determining positioning information and/or translation information.

The signals provided by this at least one sensor represent position-related information, since for instance the signals of this at least one sensor can be used to obtain or determine at least a relative movement. As an example, there may be knowledge about a starting position, and then the position-related information received from the at least one sensor may be used to track and estimate the actual position based on the known starting position. Thus, based on the position-related information from the at least one sensor, the position information may be kept up-to date in the background, and when a new set of positioning reference data is obtained or generated, the position information of the respective set of positioning reference date is obtained based on the tracked position information.

Accordingly, the position-related information received from the at least one sensor can be used to obtain or estimate the actual position information when a new set of positioning reference data is to be obtained or generated.

For instance, the at least one sensor may be part of the apparatus or may represent a separate entity which is connectable to the apparatus. For instance, this connection may be performed by means of a USB cable or a wireless connection, e.g. Bluetooth or WLAN or any other suited wireless connection. As an example, the at least one sensor may be worn on a belt or in a pocket.

Furthermore, as an example, the starting position may be manually inputted by a user or may be obtained in another well-suited way including satellite-based position prior entering indoor space.

For instance, after this plurality of sets of positioning reference data is collected, the plurality of sets of positioning reference data may be provided to a server or a similar entity, where the data may be refined in the form of a radiomap, which may then be used for positioning purposes. As an example, such a radiomap may carry fingerprints and/or radio channel models generated from the fingerprints, etc.

According to an exemplary embodiment of all aspects of the invention, said generating or obtaining the plurality of set of position reference data is performed in predetermined time intervals.

For instance, a timer may be started at the beginning and when the timer has elapsed after a predetermined time interval, and if the method has not been stopped otherwise, the method may proceed with obtaining or generating a set of positioning reference date in step 410. Then, the timer may be started again.

As an example, a plurality of sets of positioning reference data may be obtained or generated at different positions of a route in an indoor building, wherein this generating or obtaining may be performed in predetermined time intervals. For instance, this route to be walked may be displayed to the user via the user interface.

According to an exemplary embodiment of all aspects of the invention, said generating or obtaining the plurality of set of position reference data is performed distance-based and/or after a predetermined number of steps is counted.

For instance, if said generating or obtaining the plurality of set of position reference data is performed distance-based, after it has been detected that the apparatus has moved a predetermined distance a new set of position reference data is generated or obtained. Then, as an example, the next set of position reference data may be generated or obtained after the apparatus has moved a predetermined distance once again. Furthermore, for instance, the predetermined distance may be a constant value or may vary, e.g. dependent on indoor map information.

For instance, if said generating or obtaining the plurality of set of position reference data is performed after a predetermined number of steps is counted, a step counter counts the steps of a user carrying the apparatus during walk through the environment. After a predetermined number of steps is counted a new set of position reference data is generated or obtained. Then, as an example, the counter may be reset and the next set of position reference data is generated or obtained may be generated or obtained after the number of steps reaches the predetermined number of once again. Furthermore, for instance, the predetermined number of steps may be a constant value or may vary, e.g. dependent on an indoor map information.

According to an exemplary embodiment of all aspects of the invention, at least one manual position information associated with at least one position information received from a user interface is obtained.

As an example, the manual position information may represent a two-dimensional position information or may represent a three-dimensional component comprising an altitude information.

For instance, a user may input this at least one position information when he walks through the above-mentioned route while the apparatus obtains or generates the plurality of sets of positioning reference data.

As an example, the apparatus may be configured to display an indoor map to the user, e.g. on a touchscreen or on another type of display. This indoor map may be part of indoor map information available to the apparatus. Then, for instance, the user may input the actual position by an appropriate input action. As an example, the user may tip on the corresponding location of the indoor map displayed on the touchscreen. This position information may then be used as manual position information for generating or obtaining the plurality of sets of positioning reference data.

For instance, the above-mentioned starting position may be inputted as a manual position information by a user. Or, as another example, at least one manual position information associated with at least one position information received from the user interface may be obtained during the apparatus is moved through the above-mentioned route. This at least one manual position information may for instance be used to correct or adjust a position information of at least one set of positioning reference data.

Furthermore, a respective signal characteristic representation may be obtained or generated when a manual position information is obtained by a respective user input and a new set of positioning reference data may be generated based on the respective signal characteristic representation and the associated manual position information. Thus, the plurality of sets of positioning reference data may comprise at least one set of positioning reference comprising position information representing manual position information. As an example, this may hold for a set of positioning reference data associated with a starting position of a route to be walked through.

For instance, when the user reaches a reference point on a floor map, the user may stop walking and may manual input the actual position by means of the user interface, e.g. by means of clicking or tipping the corresponding position on the floor map. Then, as an example, a further set of positioning reference data may be generated or obtained based on the signal characteristic representation received at this moment and the obtained manual position information.

Furthermore, the obtained manual position information may be used for correcting or adjusting position information, which will be explained later.

For instance, a user may carry the apparatus for walking through a route, arbitrary or predefined, in an indoor floor in order to obtain or generate a plurality of sets of positioning reference data at different locations in this indoor floor.

As an example, the user may start on a predefined starting position, wherein the position information of this starting position may be known to the apparatus or may be manually inputted by the user via the user-interface. For instance, this may be performed at the start of the method. Furthermore, a first set of positioning data may be generated or obtained based on this position information of the starting position and a respective signal characteristic representation associated with at least one received signal from at least one CPE which is receivable at the starting position. Thus, a first fingerprint can be taken at the starting position.

Then, the user may start walking along the route. Then, for instance, after a predetermined time has been elapsed or, when a new step or a number of steps of the user is detected, or, when the apparatus has moved a predefined distance, a set of positioning reference data is obtained, said set comprising a respective position information obtained or generated based on position-related information from the at least one sensor and a respective signal characteristic representation associated with at least one received signal from at least one signal from at least one CPE, as mentioned above. Then, in an optional step it may be checked whether manual position information is available.

If no manual position information is available, the method may proceed with checking whether a further set of positioning reference is to be obtained or generated. For instance, a timer may be started and when the timer has elapsed after a predetermined time interval, and if the method has not been stopped otherwise, the method may proceed at the beginning with obtaining or generating a set of positioning reference date. Or, as another example, it may be determined whether a new step is detected, i.e. a step caused by the walk of the user. If yes, then a further set of positioning reference data may be obtained or generated and the method may proceed. For instance, the at least one sensor may provide a signal which is indicative of a detected step, e.g. an acceleration in vertical direction.

For instance, when the user inputs manual position information, this position information is associated with a corresponding reference position. As an example, at least one reference position may be used, wherein this at least one reference position may represent a plurality of reference positions being placed on different locations on the route to be walked.

By doing so, the user may walk through the complete route of the indoor map in order to obtain or generate a plurality of sets of positioning reference data based on position-related information from the at least one sensor along the complete or along most parts of the route, wherein, for instance, manual position information may be inputted by the user at predefined reference positions.

According to an exemplary embodiment of all aspects of the invention, at least one position information of a set of positioning reference data of said plurality of sets of positioning reference data is corrected or adjusted based on at least one manual position information of said at least one manual position information.

According to an exemplary embodiment of all aspects of the invention, said at one manual position are at least two manual positions, said correcting comprises estimating a trajectory representation between a first manual position information and a second manual position, and correcting or adjusting at least one position information based on the estimated trajectory representation.

As a non-limiting example, this estimated trajectory representation may be a straight line between the first manual position information and the second manual position information. Furthermore, as an example, the estimated trajectory may represent a curve.

For instance, the position information of at least one set of positioning reference data which has been obtained or generated between the first manual position information and the second manual position information may be used for estimating the trajectory representation. As an example, the trajectory representation may represents a smoothed curve or line between the first and second manual position information based on at least one position information of a set of positioning reference data which has been obtained or generated between the first manual position information and the second manual position information. Thus, for instance, the smoothed curve or line starts from the position indicated by the first manual position information and ends at the position indicated by the second manual position information, wherein the at least one position information of at least one set of positioning reference data which has been obtained or generated between the first manual position information and the second manual position information may be used as weighted position information in order to fit and/or smooth the trajectory between the first and second manual position information.

As a non limiting example, a locally weighted smoothed scatter plot may be applied for estimating the trajectory representation, but any other well-suited smoothing of the trajectory representation may also be applied.

Furthermore, as an example, indoor map information may be used to estimate the trajectory representation. For instance, this indoor map information may be also be used for obtaining or correcting the smoothed curve or line representing the trajectory mentioned above.

For instance, it may be checked whether a straight line between the first and second manual position information matches with the indoor map and does not interfere with a wall or another barrier of the indoor map. Or, if the trajectory represents the smoothed curve or line, it may be checked whether this smoothed curve or line matches with the indoor map and does not interfere with a wall or another barrier of the indoor map.

As an example, in case a straight line is not possible between the first manual position information and the second manual position information due to violation of the indoor map information, the estimated trajectory representation may for instance represent the shortest route between the first and second manual position information which matches with the indoor map information. Thus, indoor map information may be used to estimate a trajectory between a first manual position information and a second manual position information.

Then, at least one position information of at least one set of positioning reference data is corrected or adjusted based on the estimated trajectory representation. Thus, errors introduced by imprecise estimation of the position based on signals of the at least one sensor may be corrected or adjusted.

For instance, the position information obtained or generated based on the position-related information from the at least one sensor along a route between the first manual position information and the second manual position information may be inaccurate. Thus, the position information of at least one set of positioning reference data associated with at least one of those locations between the first manual position information and the second manual position information may corrected or adjusted based on the respective estimated trajectory.

As an example, this estimation and correction or adjusting may be performed after a new manual position information is obtained, or this may be done after the plurality of set of positioning reference data has been obtained or generated.

Thus, the manual position information inputted by the user can be used to enhance the quality of the estimated position information obtained or generated between a first manual position information and a second manual position information based on the position-related information from the at least one sensor.

According to an exemplary embodiment of all aspects of the invention, an initial direction information is obtained.

For instance, this initial direction may be used for estimating and tracking the position information based on the position-related information received from the at least one sensor if at least one sensor represents an inertial sensor. For instance, a compass may be used for obtaining the initial direction information. Or, as another example, a manually inputted initial direction received from the user interface may be used. For instance, the user may point to the direction to which he/she will go next. Thus, with respect to the starting position, the user may input via the user interface that he intends to go to into east direction under the non-limiting assumption of orientation.

For instance, if the user interface may comprise a touch screen, this direction indication might be inputted by means of swipe to that direction. As another example, the user might point to the next reference point on the indoor map, and the initial direction information might be obtained based on the straight direction from the starting position to the position of the next reference position. For instance, when a user inputs a new manual position information, the user might also input a new initial direction information which can be used to enhance the obtaining or generating the position information based on the position-related information from the at least one sensor.

According to an exemplary embodiment of all aspects of the invention, said at least one set of positioning reference data is generated or obtained further based on indoor map information.

As an example, this indoor map information may comprise indoor information, wherein this indoor information may comprise position information on walls and other indoor barriers which can not be passed by a user and it may comprise position information on areas which can be passed by a user, e.g. information on rooms, floors, doors.

For instance, this indoor map information may be used to estimate or to assist the estimation of a trajectory representation between a first manual position and a second manual position, as mentioned above.

Furthermore, as an example, the indoor map information may be used by the apparatus to determine a short route the user shall walk through in order to cover all or most of the indoor areas which are accessible by the user. For instance, a route may be mapped on the whole floor of an indoor area, wherein the route may be chosen that the time for passing the whole floor is minimized. Then, this route may be displayed to the user.

As an example, indoor map information and/or information on the route that has already been passed may be used to obtain or determine the initial direction information. For instance, if the indoor map information may show that a wall or another barrier violates with a straight route from the actual reference position to the next reference position (which may be manually inputted by the user), due to the information on the route that the user has already passed it may be determine that there is only one route left which has not been passed yet in order to reach the next reference position on a short way. Thus, based on the indoor map information and information on the route that has already been passed a new initial direction is obtained which passes along a route which has not be used so far to the next reference position, wherein the starting direction of this route may represent the initial direction. For instance, the route may be the shortest route which has not been used so far in order to reach the next reference position.

Furthermore, for instance, the information on the route that has already been passed might be used to be displayed to the user. Thus, the user may check which areas of the indoor map have already been passed and which areas have not been visited yet. Accordingly, as an example, this may assist the user to find a complete or nearly complete route through the complete building.

Since the route is known to the apparatus, this route may be used for correcting and/or adjusting positioning information and/or for obtaining the initial heading information. For instance, a real-time matching of the currently tracked position based on the position-related information from the at least one sensor and the predefined route may be performed in order to bring the currently tracked position into conformity with the predefined route. Thus, accuracy of the position information may be increased and/or the number of manual position information may be reduced.

Furthermore, in case of three-dimensional positioning, the indoor information may comprise information on stairs, elevators, escalators. Thus, the indoor map information may be used for generating or obtaining height information which may be used for generating or obtaining three-dimensional positioning information. As an example, an altitude information obtained from an altitude sensor may be corrected or adjusted based on indoor map information, e.g. by checking the proximity of stairs or scalators or elevators.

According to an exemplary embodiment of all aspects of the invention, it is checked whether a respective position information of a set of positioning reference data do not match with the indoor map information, and if the checking yields a positive result, said respective position information is corrected based on the indoor map information.

Thus, the indoor map information may be used for obtaining or generating a position information based on position-related information from at least one sensor. As an example, a position information may first be obtained or generated based on position-related information form at least one sensor, and then this position information may be corrected or adjusted based on the indoor map information. For instance, it may be checked whether this position information violates the indoor map information. As an example, such a violation may be detected when the position information is inside a wall or another barrier and/or if the position information leads to a position trajectory that crosses a wall or another barrier. Then, for instance, the position information may be corrected or adjusted to a position which is the nearest or almost nearest position on the indoor map which is accessible by a user for walking.

According to an exemplary embodiment of all aspects of the invention, said indoor map information comprises probability distribution information associated with the indoor information.

As an example, the indoor information of the radio map information may at least partially be determined based on measurements of the indoor environment. For instance, the position or course of a wall or a corridor or any other barrier, or the position of stairs, escalators, elevators and any other indoor information may be obtained based on a positioning measurement, e.g. based on said at least one sensor, wherein said positioning measurement provides position probability distribution.

For instance, an indoor information may comprise at least one position information being represented by a one, two- or three-dimensional probability distribution. As an example, a position information of a corridor may be represented by an elongated two-dimensional probability distribution.

Furthermore, said positioning information obtained or generated based on position-related information from at least one sensor may comprise position probability distribution based on the measurement of the at least one sensor.

For instance, an optimized positioning information may be generated based on the position probability distribution of the positioning information obtained or generated based on position-related information from at least one sensor combined with probability distribution information associated with the indoor information of the indoor map information. Accordingly, a joint distribution could be used for estimating or generating the position information.

As an example, this may show the advantage that if the position probability distribution of the positioning information obtained or generated based on position-related information from at least one sensor indicates that the quality of the position-related information is quite weak and the probability distribution information associated with the indoor information of the indoor map information indicates that the indoor information is better, the joint distribution leads to an estimated position information which is more based on the indoor map information than on the positioning information obtained or generated based on position-related information from at least one sensor and vice versa.

According to an exemplary embodiment of all aspects of the invention, a route in an indoor environment based on indoor map information is determined, wherein the route is configured to guide a user through the indoor environment in order to generate or obtain said plurality of sets of positioning reference data when the user walks the route.

For instance, the indoor map information may represent any kind of indoor map information mentioned above.

As an example, the determined route may be a short route or optimized route the user shall walk through in order to cover all or most of the indoor areas which are accessible by the user. For instance, a route may be mapped on the whole floor of an indoor area, wherein the route may be chosen that the time for passing the whole floor is minimized.

Then, this route may be displayed to the user. Since the route is known to the apparatus, this route may be used for correcting and/or adjusting positioning information and/or for obtaining the initial heading information. For instance, a real-time matching of the currently tracked position based on the position-related information from the at least one sensor and the predefined route may be performed in order to bring the currently tracked position into conformity with the predefined route, wherein the currently tracked position may be displayed to the user. Thus, accuracy of the position information may be increased and/or the number of manual position information may be reduced.

According to an exemplary embodiment of all aspects of the invention, at least one of said at least one sensor represents an inertial sensor.

According to an exemplary embodiment of all aspects of the invention, at least one of said at least one sensor is at least one of an accelerometer, an altitude sensor, a magnetometer, and a gyroscope.

Thus, the at least one sensor may be configured to detect a movement into at least two directions (e.g., at least two axis), wherein, for instance, the position-related information may represent at least one acceleration in a respective direction. This movement may represent a movement in a two-dimensional space or in a three dimensional space.

As an example, at least a 3-axis accelerometer and/or a 3-axis gyroscope may be used. For instance, three-dimensional indoor map information may be used.

According to an exemplary embodiment of all aspects of the invention, said at least one wireless coverage providing entity is at least one of a WLAN access point, and a wireless base station.

Furthermore, as an example, a statistic on the positioning performance may be obtained or generated based on plurality of sets of positioning reference data. For instance, after the plurality of sets of positioning reference data has been obtained or generated, this plurality of sets of positioning reference data may be used to determine the position at least one position on the indoor map, e.g. by means of comparing a position estimated based on the set of plurality of positioning reference date and the signal characteristic representation of the at least one signal from the at least one CPE received at the respective position with the real position. For instance, the statistic may comprise a deviation of the at least one estimated position and the respective at least one real position. As an example, if it is determined that the estimated position of a position does not provide a desired quality, which may for instance happen in problematic areas where not so many CPEs are receivable, further sets of positioning reference data may be obtained or generated in this problematic area in order to increase the quality of position estimation.

The example embodiments of the method, apparatus, computer program and system according to the invention presented above and their single features shall be understood to be disclosed also in all possible combinations with each other.

Further, it is to be understood that the presentation of the invention in this section is based on example non-limiting embodiments.

Other features of the invention will be apparent from and elucidated with reference to the detailed description presented hereinafter in conjunction with the accompanying drawings. It is to be understood, however, that the drawings are designed solely for purposes of illustration and not as a definition of the limits of the invention, for which reference should be made to the appended claims. It should further be understood that the drawings are not drawn to scale and that they are merely intended to conceptually illustrate the structures and procedures described therein. In particular, presence of features in the drawings should not be considered to render these features mandatory for the invention.

DETAILED DESCRIPTION OF EMBODIMENTS OF THE INVENTION

Satellite positioning does not work well indoors or in other shadowed environments. However, various fixed CPEs are ubiquitous in the modern world. Examples include cellular base stations (GSM, WCDMA, TD-SCDMA, LTE, LTE-A, CDMA/CDMA2000), WLAN access points, FM radio or TV stations. These signals have good penetration and coverage virtually everywhere of interest. Thus they are well-suited to complement or substitute satellite-based positioning methods.

There are different methods of estimating the position of an indoor terminal by means of using received signals from the available CPEs One method may apply a positioning reference database comprising a plurality of sets of positioning reference data, which may represent kind of fingerprint database, to estimate the position.

Example embodiments of the present invention disclose how obtain and/or generate the positioning reference database. For instance, this can be done during a terminal moves through an indoor building.

Figure 1:
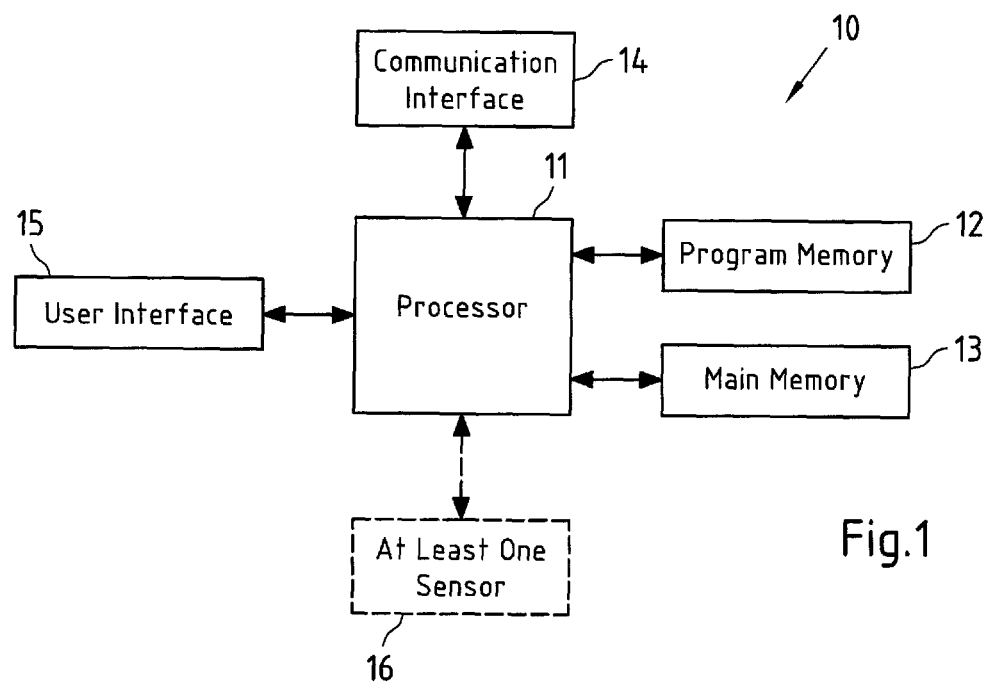
FIG. 1: a schematic block diagram of an example embodiment of an apparatus according to the invention, which is or forms a part of a terminal.

FIG. 1 is a schematic block diagram of an example embodiment of an apparatus 10 according to the invention. Apparatus 10 is or forms a part of a consumer terminal.

Apparatus 10 comprises a processor 11, which may for instance be embodied as a microprocessor, Digital Signal Processor (DSP) or Application Specific Integrated Circuit (ASIC), to name but a few non-limiting examples. Processor 11 executes a program code stored in program memory 12 (for instance program code implementing one or more of the embodiments of a method according to the invention described below with reference to FIGS. 3, 4, and 6), and interfaces with a main memory 13, which may for instance store the plurality of set of positioning reference data (or at least a part thereof). Some or all of memories 12 and 13 may also be included into processor 11. Memories 12 and/or 13 may for instance be embodied as Read-Only Memory (ROM), Random Access Memory (RAM), to name but a few non-limiting examples. One of or both of memories 12 and 13 may be fixedly connected to processor 11 or removable from processor 11, for instance in the form of a memory card or stick.

Processor 11 further controls a communication interface 14 configured to receive and/or output information. This communication may for instance be based on a wire-bound or wireless connection. Communication interface 14 may thus for instance comprise circuitry such as modulators, filters, mixers, switches and/or one or more antennas to allow transmission and/or reception of signals. The communication interface 14 is configured to receive signals from at least one CPE, wherein a respective signal characteristic representation may be obtained/generated from a respective signal of a respective CPE. In embodiments of the invention, communication interface 14 is configured to allow communication according to a 2G/3G/4G cellular CS and/or a WLAN.

Processor 11 further controls a user interface 15 configured to present information to a user of apparatus 10 and/or to receive information from such a user. Such information may for instance comprise information on a position manually inputted by a user.

For instance, processor 11 may further control at least one optional sensor 16 configured to generate position-related information. For instance, this at least one sensor 16 may represent at least one inertial sensor. This at least one sensor 16 may be part of apparatus 10 or may represent a separate entity, wherein this separate entity may be configured to be connected to the apparatus by means of a communication link, e.g. an USB cable, another cable, or a wireless communication link, e.g. Bluetooth or WLAN or any other well-suited wireless communication link.

It is to be noted that the circuitry formed by the components of apparatus 10 may be implemented in hardware alone, partially in hardware and in software, or in software only, as further described at the end of this specification.

Figure 2:
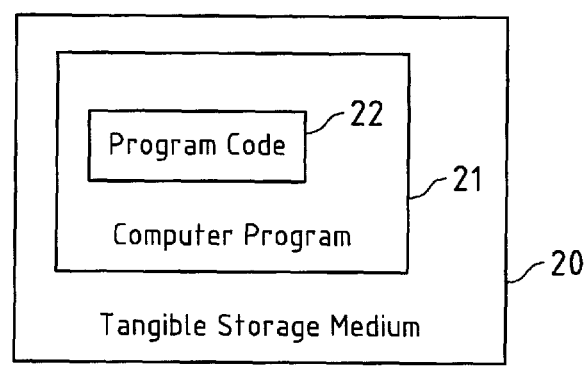
FIG. 2: a schematic illustration of an example embodiment of a tangible storage medium according to the invention.

FIG. 2 is a schematic illustration of an embodiment of a tangible storage medium 20 according to the invention. This tangible storage medium 20, which may in particular be a non-transitory storage medium, comprises a program 21, which in turn comprises program code 22 (for instance a set of instructions). Realizations of tangible storage medium 20 may for instance be program memory 12 of FIG. 1. Consequently, program code 22 may for instance implement the flowcharts of FIGS. 3, 4 and 6 discussed below.

Figure 3:
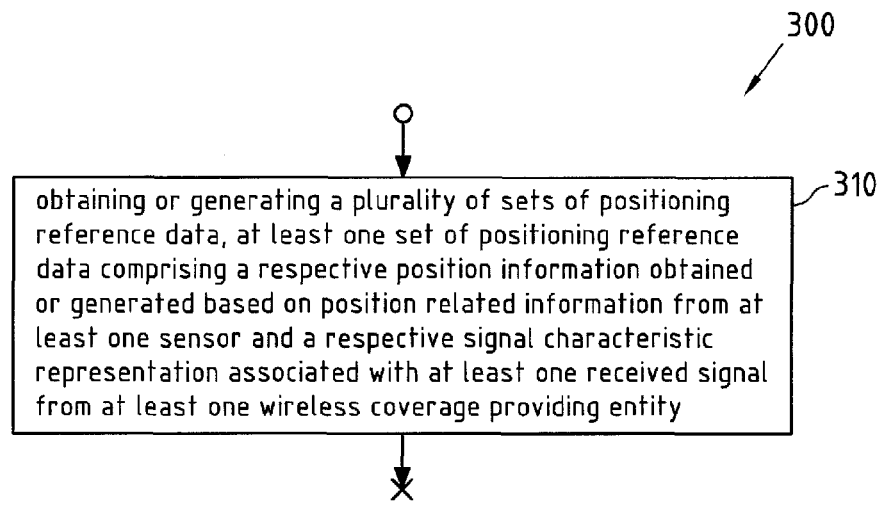
FIG. 3: a flowchart of a first example embodiment of a method according to the invention.
Figure 4:
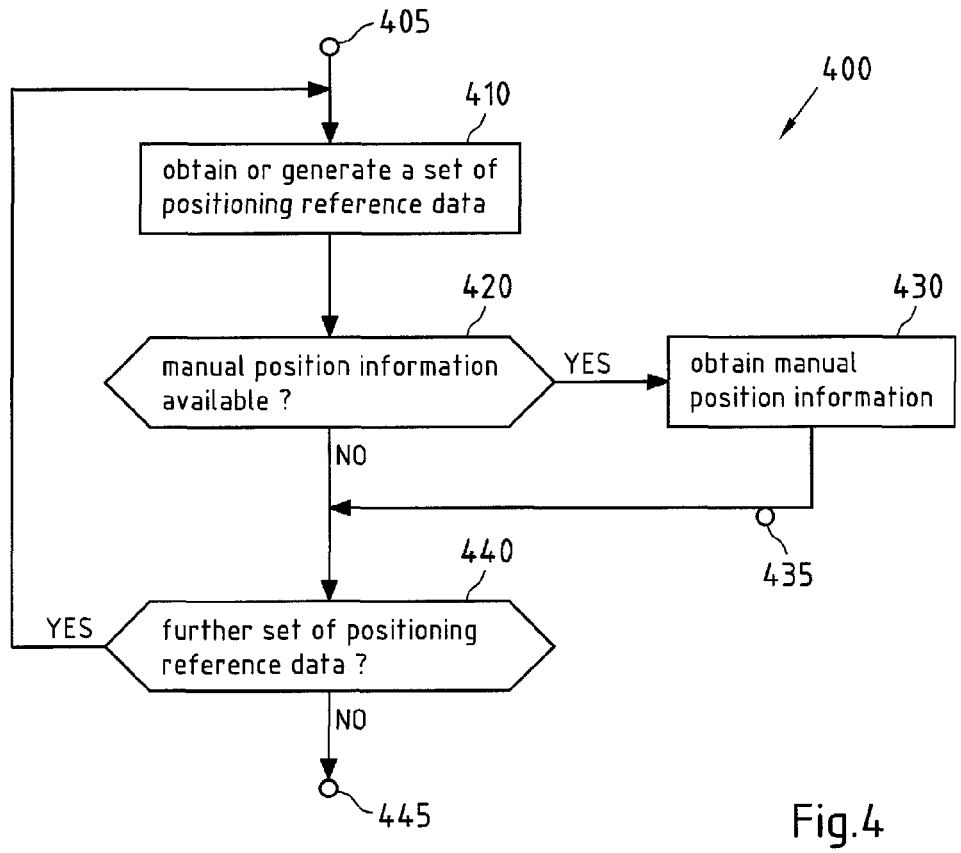
FIG. 4: a flowchart of a second example embodiment of a method according to the invention.
Figure 6:
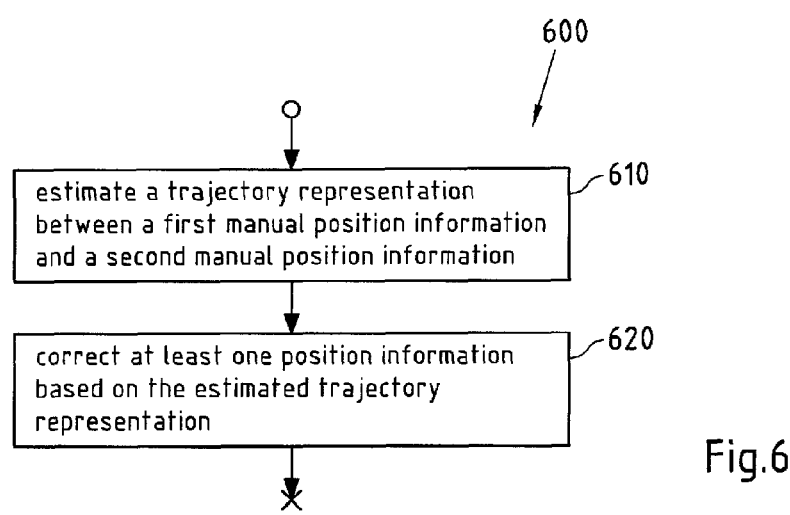
FIG. 6: a flowchart of a third example embodiment of a method according to the invention.

In the following, FIGS. 3, 4 and 6 are described relating to flowcharts of example embodiments of the invention.

FIG. 3 is a flowchart 300 of an exemplary first embodiment of a method according to the invention.

In step 310, a plurality of sets of positioning data is obtained or generated, wherein at least one set of positioning reference data of the plurality of sets of positioning data comprises a respective position information obtained or generated based on position-related information from at least one sensor, and a respective signal characteristic representation associated with at least one received signal from at least one wireless coverage providing entity.

The respective signal characteristic representation of a set of positioning reference data may be considered to represent a kind of fingerprint of at least one received signal from the at least one CPE associated with this set of positioning reference data. As an example, the respective signal characteristic may comprise for each of at least one of CPE the measured signal strength and identifier associated with the respective CPE.

Thus, for instance, the plurality of sets of positioning reference data may be obtained or generated at different time instants of time. For instance, the method may be performed by an apparatus 10, e.g. a terminal or any other handheld device, and the apparatus may be moved along a route through an indoor environment, wherein the plurality of sets of positioning reference data may be obtained or generated at different location points at different time instants. For instance, a user may carry the apparatus 10 along the route.

The signal characteristic representation of a respective set of positioning reference data is associated with the respective position information of this respective set of positioning reference data. As an example, a position information and the signal characteristic representation of the same set of positioning reference data may be both time stamped in order to bind the position information with the signal characteristic representation.

Thus, for several location points a respective set of positioning reference data can be obtained or generated, wherein the plurality of sets of positioning reference later can be used for performing an estimation of the position based on the a signal characteristic representation associated with at least one received signal of at least one CPE.

The position information of a respective set of positioning reference data is obtained or generated based on position-related information from at least one sensor. For instance, this at least one sensor may represent any kind of at least one inertial sensor. As an example, the at least one sensor may represent at least one of an accelerometer and a gyroscope and an altitude sensor and a magnetometer. Thus, the at least one sensor may be configured to detect a movement into at least two directions (e.g., at least two axis), wherein, for instance, the position-related information may represent at least one acceleration in a respective direction. This movement may represent a movement in a two-dimensional space or in a three dimensional space. As an example, at least a 3-axis accelerometer and/or a 3-axis gyroscope may be used.

The signals provided by this at least one sensor represent position-related information, since for instance the signals of this at least one sensor can be used to obtain or determine at least a relative movement. As an example, there may be knowledge about a starting position, and then the position-related information received from the at least one sensor 16 is used to track and estimate the actual position based on the known starting position. Thus, based on the position-related information from the at least one sensor 16, the position information may be kept up-to date in the background, and each time a new set of positioning reference data is obtained or generated, the position information of the respective set of positioning reference date is obtained based on the tracked position information.

Furthermore, for instance, said at least one sensor 16 may be used for determining translation information. Thus, as an example, the output of said at least one sensor 16 may be used for determining positioning information and/or translation information.

As an example, the starting position may be manually inputted by a user or may be obtained in another well-suited way.

For instance, the at least one sensor 16 may be part of the apparatus 10 or may represent a separate entity 16 which is connectable to the apparatus 10. As an example, the at least one sensor 16 may worn on a belt or in a pocket.

As an example, the method may further comprise obtaining at least one manual position information associated with at least one position information received from a user interface 15.

For instance, a user may input this at least one position information when he walks through the above-mentioned route while the apparatus 10 obtains or generates the plurality of sets of positioning reference data.

As an example, the apparatus 10 may be configured to display an indoor map to the user, e.g. on a touchscreen. This indoor map may be part of indoor map information available to the apparatus 10. Then, for instance, the user may input the actual position by an appropriate input action. As an example, the user may tip on the corresponding location of the indoor map displayed on the touchscreen. This position information may then be used as manual position information for generating or obtaining the plurality of sets of positioning reference data in step 310 of FIG. 3.

For instance, the above-mentioned starting position may be inputted as a manual position information by a user. Or, as another example, at least one manual position information associated with at least one position information received from the user interface 15 may be obtained during the apparatus 10 is moved through the above-mentioned route. This at least one manual position information may for instance be used to correct or adjust a position information of at least one set of positioning reference data.

Furthermore, a respective signal characteristic representation may be obtained or generated when a manual position information is obtained by a respective user input and a new set of positioning reference data may be generated based on the respective signal characteristic representation and the associated manual position information. Thus, the plurality of sets of positioning reference data may comprise at least one set of positioning reference comprising position information representing manual position information.

The explanations and advantages explained with respect to the method according to the first exemplary embodiment may also hold for the succeeding exemplary embodiments.

FIG. 4 is a flowchart 400 of an exemplary second embodiment of a method according to the invention. This method will be explained in conjunction with an exemplary indoor map depicted in FIG. 5.

Figure 5:
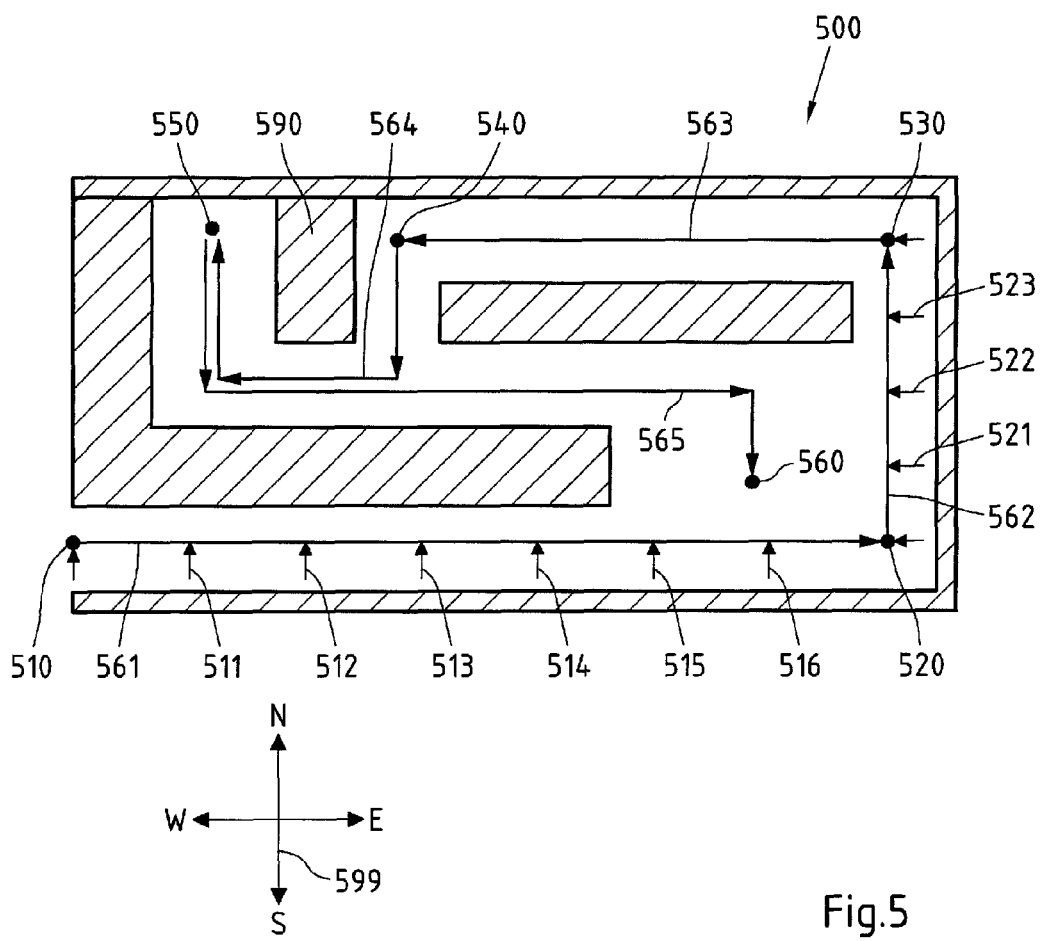
FIG. 5: an illustration of a first example of an indoor map which may be used for the invention.

For instance, a user may carry the apparatus 10 for walking through a route 561, 562, 563, 564, 565 in an indoor floor, as exemplarily depicted in FIG. 5, in order to obtain or generate a plurality of sets of positioning reference data at different locations in this indoor floor. Although FIG. 5 only depicts a two-dimensional indoor floor plan of a building, it has to be understood that method may also applied to three-dimensional floor plans of a building.

For instance, the apparatus 10 may represent a tablet apparatus or any other well-suited handheld apparatus.

As an example, the user may start on a predefined starting position 510, wherein the position information of this starting position may be known to the apparatus 10 or may be manually inputted by the user via the user-interface 16. For instance, this may be performed at the start of the method depicted in FIG. 4, e.g. at reference sign 405. Furthermore, a first set of positioning data may be generated or obtained based on this position information of the starting position 510 and a respective signal characteristic representation associated with at least one received signal from at least one CPE which is receivable at the starting position 510. Thus, a first fingerprint can be taken at the starting position 510.

Then, the user may start walking along the route depicted in FIG. 5. In a step 410, a set of positioning reference data is obtained, said set comprising a respective position information obtained or generated based on position-related information from the at least one sensor 16 and a respective signal characteristic representation associated with at least one received signal from at least one signal from at least one CPE, as mentioned above. For instance, step 410 may be performed at location 511 in FIG. 5, wherein the arrow illustrates that a set of positioning reference data is obtained or generated at this moment.

Then, in an optional step 420 it may be checked whether manual position information is available.

If no manual position information is available, the method may proceed with checking whether a further set of positioning reference is to be obtained or generated in a step 440. For instance, a timer may be started and when the timer has elapsed after a predetermined time interval, and if the method has not been stopped otherwise, the method may proceed at the beginning with obtaining or generating a set of positioning reference date in step 410. Or, as another example, it may be determined in step 440 whether a new step is detected, i.e. a step caused by the walk of the user, or whether a predetermined number of steps of the user has been detected. If yes, then a further set of positioning reference date may be obtained or generated and the method may proceed at step 410. For instance, the at least one sensor 16 may provide a signal which is indicative of a detected step, e.g. an acceleration in vertical direction. Or, as another example, it may be determined in step 440 whether the apparatus has moved a predetermined distance. If yes, then a further set of positioning reference data may be obtained or generated and the method may proceed at step 410. If no, the distance is still measured and the method may return step 440. For instance, the distance may be reset if a new set of positioning reference data is obtained or generated in step 410 or of a new manual positioning information is obtained in step 430. Thus, as an example, after a new set of positioning reference data is obtained, the value of the distance may be set to zero and determining the distance starts from zero.

As an example, by means of the method depicted in FIG. 4, a plurality of sets of positioning reference data may be obtained or generated at different positions 511, 512, 513, 514, 515, 516 of a route in an indoor building, wherein this generating or obtaining may be performed in predetermined time intervals. For instance, this route to be walked may be displayed to the user via the user interface 15.

Furthermore, at least one manual position information associated with at least one position information received from the user interface 16 may be obtained, e.g. when a user manually inputs location information during walking the route.

For instance, when the user reaches a reference point 520 on the floor map, the user may stop walking and may manual input the actual position by means of the user interface 16, e.g. by means of clicking or tipping the corresponding position 520 on the floor map. The method depicted in FIG. 4 may detect that manual position information is available in step 420 and may proceed with step 430 in order to obtain the manual position information. Then, as an example, a further set of positioning reference data may be generated or obtained based on the signal characteristic representation received at this moment and the obtained manual position information. Furthermore, the obtained manual position information may be used for correcting or adjusting position information, which will be explained later.

Furthermore, the obtained manual position information may be used to re-calibrate the position estimation based on the position-related information from the at least one sensor 16. Thus, as an example, an error propagation may be prevented by using the newly obtained manual position information as a new starting position which serves as a basis for the background position estimation based on the position-related information from the at least one sensor 16, which may be used to obtain or generate the position information in step 410 in order to obtain or generated a new set of positioning reference data.

It has to be understood that the method depicted in FIG. 4 may be interrupted whenever a manual position information is available and may then proceed at step 430.

Thus, a user may walk along the route depicted in floor map 500 in FIG. 5, wherein a plurality of sets of positioning reference data is obtained or generated when the method iterates through step 410, e.g. in predetermined time intervals or when a new step is detected.

For instance, after the manual information has been received at reference position 520, the user may walk to the next reference position 530 while further sets of positioning reference data is obtained or generated at locations 521, 522, 523 until the apparatus reaches the second reference position 530, where the user may input a new manual position information.

By doing so, the user may walk through the complete route of the indoor map in order to obtain or generate a plurality of sets of positioning reference data (not indicated in FIG. 5) along the complete or along most parts of the route, wherein, for instance, manual position information may be inputted by the user at predefined reference positions 540, 550 and 560. For instance, a predefined reference position may be any position where the user manually inputs position information.

Furthermore, for instance, said indoor map information comprises probability distribution information associated with the indoor information.

As an example, the indoor information of the radio map information may at least partially be determined based on measurements of the indoor environment. For instance, the position or course of a wall or a corridor or any other barrier, or the position of stairs, escalators, elevators and any other indoor information may be obtained based on a positioning measurement, e.g. based on said at least one sensor, wherein said positioning measurement provides position probability distribution.

For instance, an indoor information may comprise at least one position information being represented by a one, two- or three-dimensional probability distribution. As an example, a position information of a corridor may be represented by an elongated two-dimensional probability distribution.

Furthermore, said positioning information obtained or generated based on position-related information from at least one sensor may comprise position probability distribution based on the measurement of the at least one sensor.

For instance, an optimized positioning information may be generated based on the position probability distribution of the positioning information obtained or generated based on position-related information from at least one sensor combined with probability distribution information associated with the indoor information of the indoor map information, wherein this optimized positioning information may be determined in step 410 and may be used as position information of the set of positioning reference date obtained or generated in step 410. Accordingly, a joint distribution could be used for estimating or generating the position information.

As an example, this may show the advantage that if the position probability distribution of the positioning information obtained or generated based on position-related information from at least one sensor indicates that the quality of the position-related information is quite weak and the probability distribution information associated with the indoor information of the indoor map information indicates that the indoor information is better, the joint distribution leads to an estimated position information which is more based on the indoor map information than on the positioning information obtained or generated based on position-related information from at least one sensor and vice versa.

Furthermore, an initial direction information may be obtained when the method depicted in FIG. 4 is started, wherein this initial direction may be used for estimating and tracking the position information based on the position-related information received from the at least one sensor 16 if at least one sensor represents an inertial sensor. For instance, a compass may be used for obtaining the initial direction information. Or, as another example, a manually inputted initial direction received from the user interface 16 may be used. For instance, the user may point to the direction to which he/she will go next. Thus, with respect to the starting position, the user may input via the user interface 16 that he intends to go to into east direction under the non-limiting assumption of orientation 599.

For instance, if the user interface 16 may comprise a touch screen, this direction indication might be inputted by means of swipe to that direction. As another example, the user might point to the next reference point on the indoor map, e.g. on reference point 520, and the initial direction information might be obtained based on the straight direction from the starting position 510 to the position of the next reference position 520, if this is a straight line not violating the indoor map information, which will be explained later. For instance, when a user inputs a new manual position information, the user might also input a new initial direction information which can be used to enhance the obtaining or generating the position information based on the position-related information from the at least one sensor 16.

For instance, at reference point 520, the user might indicate that he proceeds moving into north direction. As an example, this may be done by pointing to the next reference position 530, wherein the straight route between actual reference position 520 and the next reference position 530 defines the direction. Or, as another example, having input the manual location at 520, the user may just continue towards 530, and when the user arrives at position 530 and clicks on the map, the program backtracks the route.

Furthermore, indoor map information and/or information on the route that has already been passed may be used to obtain or determine the initial direction information. For instance, if reference position 540 represents the actual reference point and the user points to reference position 550 as next reference point, the indoor map information may show that wall 590 violates with a straight route from the actual reference position 540 to the next reference position. Due to the information on the route that the user has already passed it is known that route 531 between reference position 530 and actual reference position 540 has already been passed. Thus, based on the indoor map information and information on the route that has already been passed a new initial direction is obtained which passes along a route which has not be used so far to the next reference position 550, wherein the starting direction of this route represents the initial direction. For instance, the route may be the shortest route which has not been used so far. In this example, route 564 would represent this route starting from actual reference position 540, since route 563 has already been passed and/or since route 564 represents the shortest route from the actual reference position 540 and the next reference position 550. Thus, the new initial direction starting from actual reference position 540 might be determined to be a south direction.

Furthermore, the information on the route that has already been passed might be used to be displayed to the user. Thus, the user may check which areas of the indoor map have already been passed and which areas have not been visited yet. Accordingly, as an example, this may assist the user to find a complete or nearly complete route through the complete building.

Figure 7:
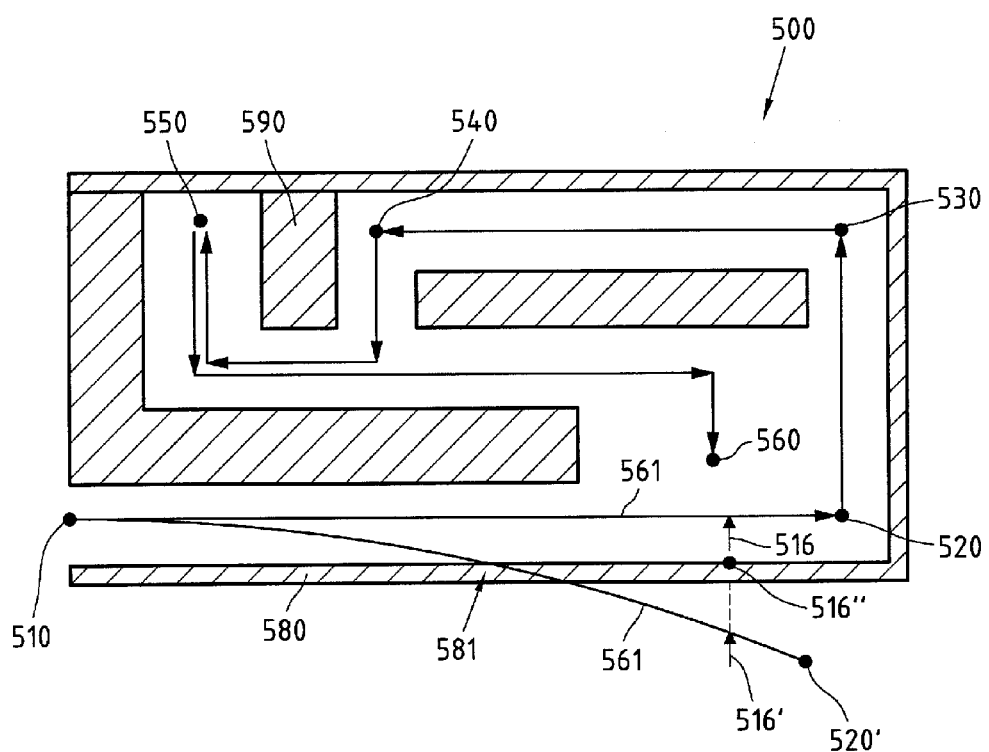
FIG. 7: an illustration of a second example of an indoor map which may be used for the invention.

FIG. 6 is a flowchart 600 of an exemplary third embodiment of a method according to the invention. This method will be explained in conjunction with the exemplary indoor map depicted in FIG. 5 and depicted in FIG. 7.

In a step 610, this method comprises estimating a trajectory representation between a first manual position information and a second manual position information. For instance, with respect to the exemplary indoor map 500 depicted in FIG. 5 or FIG. 7, a trajectory representation 561 may be estimated between the starting point, which may represent a first manual position information, and the first reference point, which may represent a second manual position. As an example, this trajectory representation 561 may be a straight line, as exemplary depicted in FIGS. 5 and 7, or a curve. Furthermore, indoor map information may be used to estimate the trajectory representation.

For instance, it may be checked whether a straight line between the first and second manual position information matches with the indoor map and does not interfere with a wall or another barrier of the indoor map. As an example, in case reference point 540 represents the first manual position information and the reference point 550 represent the second manual position information used at step 610, then it might by detected that a straight line is not possible between the first manual position information 540 and the second manual position information 550 due to the wall between those locations. Thus, as an example, the estimated trajectory 564 may represent the shortest route between the first and second manual position information which matches with the indoor map information, i.e. in this example, this estimated trajectory 564 may pass around the wall 590, e.g. in the middle of the floor. Thus, indoor map information may be used to estimate a trajectory between a first manual position information and a second manual position information.

For instance, the position information of at least one set of positioning reference data which has been obtained or generated between the first manual position information and the second manual position information may be used for estimating the trajectory representation. As an example, the trajectory representation may represent a smoothed curve or line between the first and second manual position information based on at least one position information of a set of positioning reference data which has been obtained or generated between the first manual position information and the second manual position information. Furthermore, as an example, indoor map information may be used to estimate the trajectory representation. For instance, this indoor map information may be also be used for obtaining or correcting the smoothed curve or line representing the trajectory mentioned above.

In a step 620, at least one position information of at least one set of positioning reference data is corrected or adjusted based on the estimated trajectory representation 561. Thus, errors introduced by imprecise estimation of the position based on signals of the at least one sensor 16 may be corrected or adjusted. For instance, trajectory 561' depicted in FIG. 7 may represent an example of an inaccurate positioning estimation based on the position-related information of the at least one sensor 16, wherein the quality of the position estimation decreases when the apparatus 10 moves away from the starting point 510. For instance, the estimated position 520' of the first reference point may differ from the real position of the first reference point. Accordingly, the position information obtained or generated based on the position-related information from the at least one sensor 16 along the route 561, e.g. at locations 511, 512, 513, 514, 515 and 516 between the starting point 510 and the first reference point 520 may be inaccurate. Thus, the position information of at least one set of positioning reference data associated with at least one of said locations 511, 512, 513,514, 515 and 516 may corrected or adjusted based on the estimated trajectory 561 which has been determined in step 610 based on the first manual position information 510 and on the second manual position information 520.

As an example, with respect to the exemplary method depicted in FIG. 4, this correction or adjusting may be performed after a new manual position information is obtained in step 430, e.g. at reference number 435, or this may be done after the plurality of set of positioning reference data has been obtained or generated and it is decided in step 440 that no further set of positioning reference data is to be obtained or generated, i.e. this correction or adjusting may be performed at reference number 445 in FIG. 4.

Thus, the manual position information inputted by the user can be used to enhance the quality of the estimated position information obtained or generated between a first manual position information and a second manual position information based on the position-related information from the at least one sensor 16.

Furthermore, as another example, said at least one set of positioning reference data may be generated or obtained further based on indoor map information. As an example, this indoor map information may comprise information on walls and other indoor barriers which can not be passed by a user and it may comprise information on areas which can be passed by a user, e.g. information on rooms, floors, doors.

For instance, this indoor map information may be used to estimate or to assist the estimation of a trajectory representation between a first manual position and a second manual position, as mentioned above.

Furthermore, the indoor map information may be used for obtaining or generating a position information based on position-related information form at least one sensor 16. As an example, a position information may first be obtained or generated based on position-related information form at least one sensor 16, and then this position information may be corrected or adjusted based on the indoor map information. For instance, it may be checked whether this position information violates the indoor map information. As an example, such a violation may be detected when the position information is inside a wall 580, 590 or another barrier and/or if the position information leads to a position trajectory 561' that crosses a wall 580, 590 or another barrier, as exemplary indicated at position 581 in FIG. 7. Then, for instance, the position information may be corrected or adjusted to a position which is the nearest position on the indoor map which is accessible by a user for walking.

As an example, it may be detected that position information 516' obtained or generated based on position-related information form at least one sensor 16 violates the indoor map information, since it might be detected to be outside the floor defined by starting point 510. Thus, based on the indoor map information, the position information 516' may be adjusted to represent the nearest position on the indoor map which is accessible by a user when walking the route started at the newest manual position information, i.e. in this case the starting point 510. For this example, the adjusted indoor position may be chosen to be the position 516" at the inside of wall 580 inside the floor which is nearest to the original position information 516'.

For instance, the indoor map information may be used by the apparatus 10 to determine a short route trough the user shall walk through in order to cover all or most of the indoor areas which are accessible by the user. For instance, a route may be mapped on the whole floor of an indoor area, wherein the route may be chosen that the time for passing the whole floor is minimized.

Then, this route may be displayed to the user. Since the route is known to the apparatus, this route may be used for correcting and/or adjusting positioning information and/or for obtaining the initial heading information. For instance, a real-time matching of the currently tracked position based on the position-related information from the at least one sensor 16 and the predefined route may be performed in order to bring the currently tracked position into conformity with the predefined route. Thus, accuracy of the position information may be increased and/or the number of manual position information may be reduced.

Furthermore, as an example, a statistic on the positioning performance may be obtained or generated based on plurality of sets of positioning reference data. For instance, after the plurality of sets of positioning reference data has been obtained or generated, e.g. at reference sign 445 in FIG. 5, this plurality of sets of positioning reference data may be used to determine the position at least one position on the indoor map, e.g. by means of comparing a position estimated based on the set of plurality of positioning reference date and the signal characteristic representation of the at least one signal from the at least one CPE received at the respective position with the real position. For instance, the statistic may comprise a deviation of the at least one estimated position and the respective at least one real position. As an example, if it is determined that the estimated position of a position does not provide a desired quality, which may for instance happen in problematic areas where not so many CPEs are receivable, further sets of positioning reference data may be obtained or generated in this problematic area in order to increase the quality of position estimation.

Example embodiments of the invention thus inter alia allow for an efficient method of generating or obtaining a plurality of sets of positioning reference data.

As used in this application, the term 'circuitry' refers to all of the following:
(a) hardware-only circuit implementations (such as implementations in only analog and/or digital circuitry) and
(b) combinations of circuits and software (and/or firmware), such as (as applicable):
(i) to a combination of processor(s) or
(ii) to portions of processor(s)/software (including digital signal processor(s)), software, and memory(ies) that work together to cause an apparatus, such as a mobile phone or a positioning device, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a positioning device.

As used in this application, the wording "X comprises A and B" (with X, A and B being representative of all kinds of words in the description) is meant to express that X has at least A and B, but can have further elements. Furthermore, the wording "X based on Y" (with X and Y being representative of all kinds of words in the description) is meant to express that X is influenced at least by Y, but may be influenced by further circumstances. Furthermore, the undefined article "a" is—unless otherwise stated—not understood to mean "only one".

The invention has been described above by means of embodiments, which shall be understood to be non-limiting examples. In particular, it should be noted that there are alternative ways and variations which are obvious to a skilled person in the art and can be implemented without deviating from the scope and spirit of the appended claims. It should also be understood that the sequence of method steps in the flowcharts presented above is not mandatory, also alternative sequences may be possible.

The invention claimed is:

1. A method performed by an apparatus, said method at least comprising:
generating or obtaining a radio map, comprising a plurality of sets of positioning reference data, wherein at least one set of positioning reference data of the plurality of sets of positioning reference data comprises:
a respective position information obtained or generated based on position-related information from at least one sensor, and
a respective signal characteristic representation of signal strength associated with at least one received signal from at least one wireless coverage providing entity, the respective signal characteristic further comprising an identifier of the at least one wireless coverage providing entity,
the method further comprising,
obtaining at least a first manual position information and a second manual position information, each of which is associated with at least one position information received from a user interface, and
correcting at least one position information of a set of positioning reference data of said plurality of sets of positioning reference data based on said at least a first manual position information and a second manual position information, said correcting comprising:
estimating a trajectory representation between said first manual position information and said second manual position information using indoor map information, wherein the estimated trajectory information is a shortest route between the first manual position information and the second manual position information that matches the indoor map and does not violate a barrier of the indoor map, and correcting said at least one position information based on the estimated trajectory representation.

2. The method according to claim 1, wherein said estimating a trajectory representation is based on the position information of at least one set of positioning reference data obtained or generated between the first manual position information and the second manual position information.

3. The method according to claim 1, wherein said at least one set of positioning reference data is generated or obtained further based on indoor map information.

4. The method according to claim 3, comprising checking whether a respective position information of a set of positioning reference data does not match with the indoor map information, and if the checking yields a positive result, correcting said respective position information based on the indoor map information.

5. The method according to claim 3, wherein said indoor map information comprises probability distribution information associated with indoor information.

6. The method according to claim 1, comprising obtaining an initial direction information.

7. The method according to claim 1, wherein at least one of said at least one sensor represents an inertial sensor.

8. The method according to claim 1, wherein said generating or obtaining the plurality of sets of position reference data is performed in predetermined time intervals and/or performed distance-based and/or after a predetermined number of steps is counted.

9. The method according to claim 1, comprising determining a route in an indoor environment based on indoor map information, wherein the route is configured to guide a user through the indoor environment in order to generate or obtain said plurality of sets of positioning reference data when the user walks the route.

10. A computer program product comprising a non-transitory computer-readable medium having computer executable computer program code stored thereon, which when executed by a processor causes an apparatus to:
generate or obtain a radio map, comprising a plurality of sets of positioning reference data, wherein at least one set of positioning reference data of the plurality of sets of positioning reference data comprises:
a respective positioning information obtained or generated based on position-related information from at least one sensor, and
a respective characteristic representation of signal strength associated with at least one received signal from at least one wireless coverage providing entity, the respective signal characteristic further comprising an identifier of the at least one wireless coverage providing entity,
and further causes the apparatus to:
obtain at least a first manual position information and a second manual position information, each of which is associated with at least one position information received from a user interface, and
correct at least one position information of a set of positioning reference data of said plurality of sets of positioning reference data based on said at least a first manual position information and a second manual position information,
said correcting comprising:
estimating a trajectory representation between said first and second manual position information using indoor map information, wherein the estimated trajectory information is a shortest route between the first manual position information and the second manual position information that matches the indoor map and does not violate a barrier of the indoor map, and
correcting said at least one position information based on the estimated trajectory representation.

11. An apparatus, comprising at least one processor; and at least one memory including computer program code, said at least one memory and said computer program code configured to, with said at least one processor, cause said apparatus at least to:
generate or obtain a radio map, comprising a plurality of sets of positioning reference data, wherein at least one set of positioning reference data of the plurality of sets of positioning reference data comprises:
a respective position information obtained or generated based on position-related information from at least one sensor, and
a respective signal characteristic representation of signal strength associated with at least one received signal from at least one wireless coverage providing entity, the respective signal characteristic further comprising an identifier of the at least one wireless coverage providing entity,
wherein said apparatus is further caused to:
obtain at least a first manual position information and a second manual position information, each of which is associated with at least one position information received from a user interface, and
correct at least one position information of a set of positioning reference data of said plurality of sets of positioning reference data based on said at least a first manual position information and a second manual position information,
said correction comprising:
estimation of a trajectory representation between said first manual position information and said second manual position information using indoor map information, wherein the estimated trajectory information is a shortest route between the first manual position information and the second manual position information that matches the indoor map and does not violate a barrier of the indoor map, and
correction of said at least one position information based on the estimated trajectory representation.

12. The apparatus according to claim 11, wherein said estimation of a trajectory representation is based on the position information of at least one set of positioning reference data obtained or generated between the first manual position information and the second manual position information.

13. The apparatus according to claim 11, wherein said at least one set of positioning reference data is generated or obtained further based on indoor map information.

14. The apparatus according to claim 13, comprising checking whether a respective position information of a set of positioning reference data does not match with the indoor map information, and if the checking yields a positive result, correcting said respective position information based on the indoor map information.

15. The apparatus according to claim 13, wherein said indoor map information comprises probability distribution information associated with the indoor information.

16. The apparatus according to claim 11, comprising obtaining an initial direction information.

17. The method according to claim 1, wherein said at least one position information is corrected to a position, on the indoor map, that is accessible by a user for walking and that is nearest to a position indicated by the at least one position information.

18. The computer program product according to claim 10, wherein said at least one position information is corrected to a position, on the indoor map, that is accessible by a user for walking and that is nearest to a position indicated by the at least one position information.

19. The apparatus according to claim 11, wherein said at least one position information is corrected to a position, on the indoor map, that is accessible by a user for walking and that is nearest to a position indicated by the at least one position information.

\* \* \* \* \*